United States Patent [19]

Lukas et al.

[11] Patent Number: 5,133,033
[45] Date of Patent: Jul. 21, 1992

[54] OPTICAL FIBER MECHANICAL SPLICE AND METHOD FOR ITS USE

[75] Inventors: Helmut H. Lukas, Carleton Place; Grant K. Pacey, Stittsville; Steve J. Lischynsky, Ottawa, all of Canada

[73] Assignee: Northern Telecom Limited, Montreal, Canada

[21] Appl. No.: 676,596

[22] Filed: Mar. 28, 1991

Related U.S. Application Data

[63] Continuation-in-part of Ser. No. 531,417, May 31, 1990, Pat. No. 5,029,972.

[51] Int. Cl.⁵ .............................................. G02B 6/38
[52] U.S. Cl. ...................................... 385/65; 385/137
[58] Field of Search .................... 385/56, 62, 65, 70, 385/137

[56] References Cited

U.S. PATENT DOCUMENTS

| | | | |
|---|---|---|---|
| 4,435,038 | 3/1984 | Soes et al. | 350/96.21 |
| 4,562,632 | 1/1986 | Parchet | 350/96.21 |
| 4,629,284 | 12/1986 | Malavieille | 385/70 |
| 4,662,962 | 5/1987 | Malavieille | 350/96.21 |
| 4,730,892 | 3/1988 | Anderson et al. | 350/96.21 |
| 4,818,055 | 4/1989 | Patterson | 350/96.2 |
| 4,824,197 | 4/1989 | Patterson | 350/96.2 |
| 4,850,671 | 7/1989 | Finzel | 350/96.21 |
| 4,865,412 | 9/1989 | Patterson | 350/96.22 |
| 4,997,255 | 3/1991 | Lukas et al. | 350/96.21 |
| 5,013,123 | 5/1991 | Patterson | 350/96.2 |

FOREIGN PATENT DOCUMENTS

WO86/01306 2/1986 European Pat. Off. .

OTHER PUBLICATIONS

Journal of Lightwave Technology, Nov. 7, 1989, vol. 7, No. 11, N.Y., US, "A New Low-Cost High-Performance Mechanical Optical Fiber Splicing System for Construction and Restoration in the Subscriber Loop", Richard A. Patterson.

Primary Examiner—John D. Lee
Assistant Examiner—John Ngo
Attorney, Agent, or Firm—C. W. Junkin

[57] ABSTRACT

An optical fiber mechanical splice comprises a pair of gripping members and a resilient biasing member. Each gripping member has a plastically deformable griping surface. One of the gripping surfaces has a v-groove for receiving and aligning optical fiber ends. The resilient biasing means acts between the gripping members to resiliently bias the gripping surfaces of the gripping members toward one another. In use of the mechanical splice, the gripping surfaces are urged toward one another with optical fiber ends in abutting alignment in the v-groove. The gripping surfaces plastically deform around the fiber ends to provide a larger area of contact between the fiber ends and the gripping surfaces.

18 Claims, 4 Drawing Sheets

OPTICAL FIBER MECHANICAL SPLICE AND METHOD FOR ITS USE

RELATED APPLICATIONS

This application is a continuation-in-part of U.S. patent application Ser. No. 531,417, filed May 31, 1990, in the names of H. H. Lukas, G. K. Pacey and S. J. Lischynsky, now allowed, U.S. Pat. No. 5,029,972.

FIELD OF THE INVENTION

This invention relates to optical fiber mechanical splices and to methods for their use.

BACKGROUND OF THE INVENTION

Optical fibers are now commonly used as a telecommunications transmission medium. The optical fibers are packaged in protective cables, and the cables are drawn through underground ducts, ploughed into trenches or strung between poles.

For the assembly of optical fiber telecommunications systems and for maintenance and repair of such systems, optical fibers must be joined end-to-end to provide optical coupling between adjacent lengths of optical fiber. Optical fiber connectors are provided where a need for future disconnection and reconnection is anticipated. Where limited need for future disconnection and reconnection is anticipated, optical fiber splices are provided.

In one conventional method for splicing optical fibers, prepared ends of the optical fibers are brought into abutting alignment and heated by means of an electric arc or flame to cause the ends of the fibers to fuse together. While this splicing method is very effective, some field personnel are reluctant to use an electric arc or flame in underground environments in case explosive gases may be present. Moreover, the equipment which supplies the electric arc or flame is bulkier and more expensive than desired.

In other known methods for splicing optical fibers, the prepared ends of the optical fibers are brought into abutting alignment within a mechanical splice and clamped or cemented within the mechanical splice. For example, U.S. Pat. No. 4,730,892, which was issued Mar. 15, 1988, in the names of John C. Anderson et al, describes a mechanical splice which comprises a base member, an elastomer alignment sleeve and a cover member. The base member has a v-groove which extends along a central portion of the base member. The elastomer alignment sleeve fits into the v-groove. The cover member fits onto the base member over the v-groove and, together with the base member, defines end apertures which permit insertion of prepared fiber ends between the base member and the cover member into opposite ends of the elastomer alignment sleeve. The cover member includes two barbed studs which are pressed into respective apertures of the cover member to clamp protective material surrounding the fiber ends, and a screw-driven plunger which is driven against the elastomer alignment sleeve to urge the alignment sleeve into the v-groove, thereby compressing the alignment sleeve onto the abutting fiber ends to align and clamp the fiber ends.

U.S. Pat. No. 4,997,255, issued on Mar. 5, 1991, in the names of H. H. Lukas et al, describes a mechanical splice in which three gripping members are resiliently biased against a base member at adjacent gripping positions along a reference surface of the base member. The reference surface of the base member has a groove for receiving the ends of optical fibers to be spliced. The outer two gripping members are used to grip protective material which surrounds the optical fiber ends, and the central gripping member is used to grip bare ends of the optical fibers from which the protective material has been stripped.

SUMMARY OF THE INVENTION

This invention provides a novel optical fiber mechanical splice which is simple to manufacture and easy to use. This invention also provides a novel method for splicing optical fibers using the novel mechanical splice, and a novel tool for use with the novel mechanical splice.

One aspect of the invention provides an optical fiber mechanical splice comprising a pair of gripping members and a resilient biasing means. Each gripping member has a plastically deformable gripping surface. The resilient biasing means acts between the gripping members to resiliently bias the gripping surfaces of the gripping members toward one another. One of the gripping surfaces has walls defining a v-groove for receiving and aligning optical fiber ends.

Another aspect of the invention provides a method for using the mechanical splice. According to this method, the gripping surfaces of the gripping members are moved apart against the urging of the resilient biasing means and optical fiber ends are inserted into the v-groove between the gripping surfaces of the gripping members. The gripping surfaces are urged toward one another with the optical fiber ends in the v-groove to engage the optical fiber ends between the gripping surfaces and to plastically deform the gripping surfaces around the optical fiber ends.

The plastic deformation of the gripping surfaces provides a larger area of contact between the fiber ends and the gripping surfaces than would be provided if the gripping surfaces did not deform. This larger contact area permits greater lateral retaining forces to be applied to the fiber ends without the application of unacceptably large stresses to the surface of the fiber ends. Such stresses, if too large, could degrade the mechanical reliability of the fiber ends. Moreover, the plastic deformation of the gripping surfaces provides better alignment of fiber ends which have slight differences in outer diameter.

Plastic deformation of the gripping surfaces is preferred to resilient deformation because fiber ends gripped between plastically deformed gripping members have a greater resistance to pulling longitudinally out of the splice than do fiber ends gripped between resiliently deformed gripping members.

In one embodiment, the resilient biasing means urge the gripping surfaces together with a force which is insufficient to plastically deform the gripping surfaces. Force additional to the force provided by the resilient biasing means is applied to urge the gripping surfaces toward one another with the optical fiber ends in the v-groove to plastically deform the gripping surfaces around the optical fiber ends. The additional force is then removed, so that only the force provided by the resilient biasing means urges the gripping surfaces toward one another to grip the optical fiber ends between the deformed gripping surfaces.

In another embodiment, the resilient biasing means urge the gripping surfaces together with a force which is sufficient to plastically deform the gripping surfaces.

The gripping surfaces are urged apart against the urging of the resilient biasing means to permit insertion of optical fiber ends along the v-groove and, when the optical fiber ends are in place, the resilient biasing means is permitted to urge the gripping surfaces together to plastically deform the gripping surfaces around the optical fiber ends.

A jig can be provided for use with the mechanical splice to perform the splicing method. Thus, another aspect of the invention provides a jig comprising means for retaining the mechanical splice and means for releasably urging the gripping surfaces apart against the urging of the resilient biasing means to permit insertion of optical fiber ends along the v-groove.

Where the resilient biasing means of the mechanical splice urge the gripping surfaces together with a force which is insufficient to plastically deform the gripping surfaces, the jig may further comprise means for releasably urging the gripping surfaces toward one another with a force sufficient to plastically deform the gripping surfaces around the optical fiber ends.

BRIEF DESCRIPTION OF THE DRAWINGS

Embodiments of the invention will now be described by way of example only. Reference will be made to accompanying drawings, in which.

DESCRIPTION OF EMBODIMENTS

Figure 1:
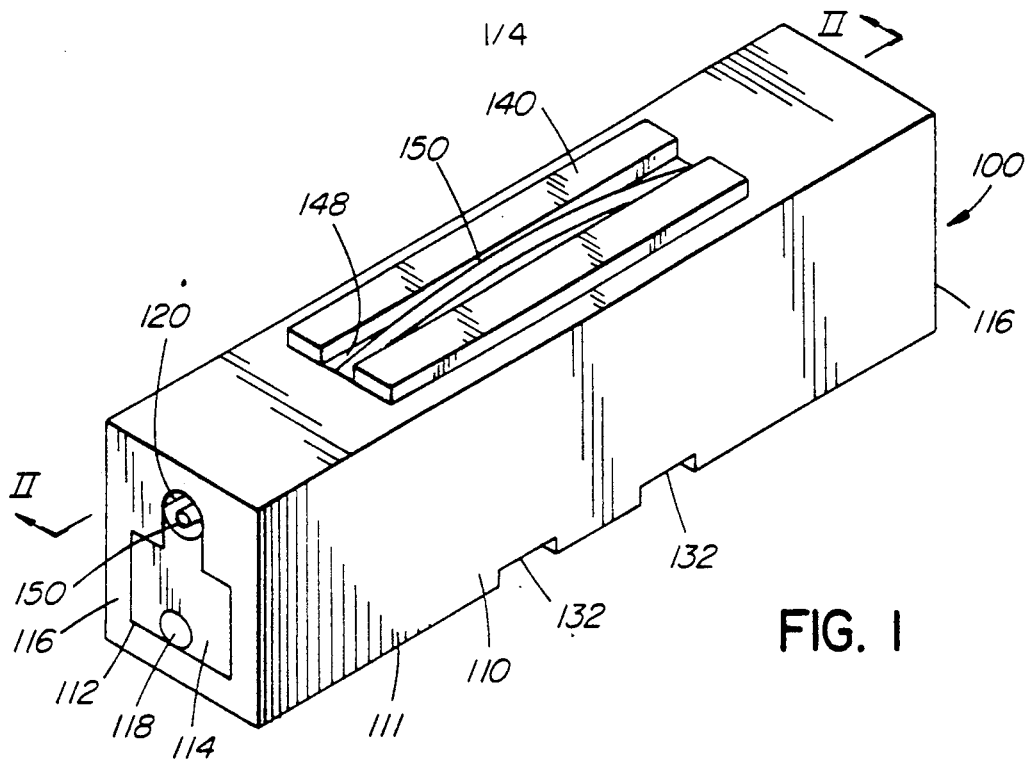
FIG. 1 is perspective view of a mechanical splice according to an embodiment of the invention.
Figure 2:
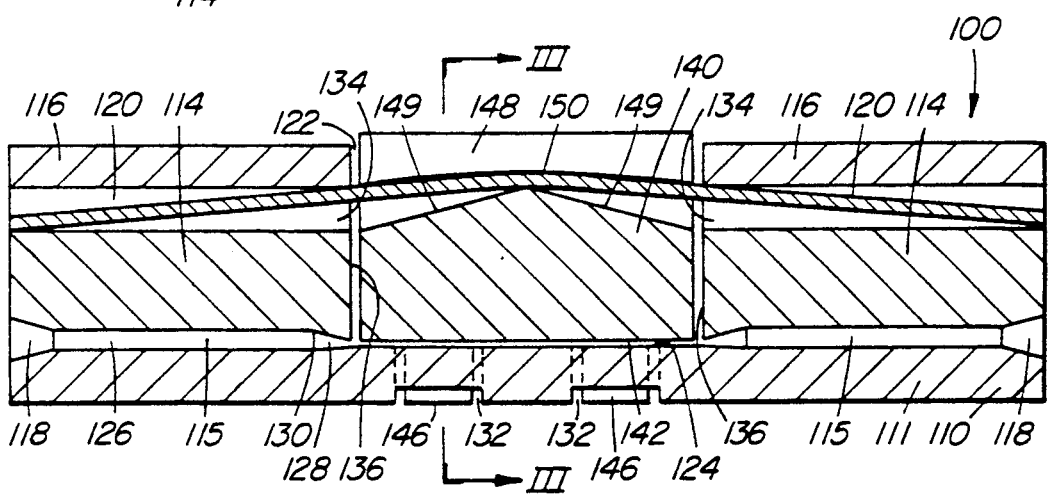
FIG. 2 is a cross-sectional view of the mechanical splice of FIG. 1 taken on section line II—II in FIG. 1.
Figure 3:
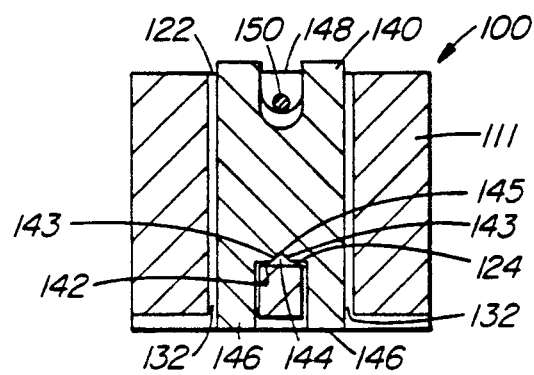
FIG. 3 is a cross-sectional view of the mechanical splice of FIG. 1 taken on section line III—III in FIG. 2.

FIG. 1 is a perspective view of a mechanical splice 100 according to an embodiment of the invention. FIGS. 2 and 3 are cross-sectional views of the mechanical splice 100. The mechanical splice 100 comprises a first gripping member 110, a second gripping member 140 and resilient biasing means in the form of a resilient wire 150.

The first gripping member 110 comprises a molded plastic part 111 which has a longitudinally extending passage 112, and plug elements 114 which are received in end portions 115 of the passage 112 adjacent ends 116 of the plastic part 111. The plug elements 114 divide the passage 112 into a passage 118 for receiving optical fibers and a passage 120 for receiving the resilient wire 150. An opening 122 extends laterally into the passage 118 and terminates at a gripping surface 124 of the first gripping member 110. The plug elements 114 define wide portions 126 of the passage 118 adjacent to the ends 116 of the first gripping member 110 for receiving optical fibers and surrounding protective material, such as a silicone buffer, and narrower portions 128 of the passage 118 adjacent to the opening 122 for receiving bare optical fiber ends. Shoulders 130 define the transition between the wide portions 126 and the narrower portions 128. The plug elements 114 are held in the passage 112 by a friction fit. Differently sized plug elements 114 are provided to suit optical fibers having different buffer diameters.

Two longitudinally spaced pairs of laterally spaced apertures 132 extend through the gripping surface 124 of the first gripping member 110. Holes 134 for receiving ends of the resilient wire 150 extend from opposite sides 136 of the opening 122 to the passage 120 for receiving the resilient wire 150.

The second gripping member 140 is slidably received in the opening 122 of the first gripping member 110 and has a gripping surface 142 opposite the gripping surface 124 of the first gripping member 110. The gripping surface 142 of the second gripping member 140 has walls 143 defining a v-groove 144 for receiving optical fibers. The second gripping member 140 has two longitudinally spaced pairs of laterally spaced projections 146. The second gripping member 140 also has a channel 148 for receiving a central portion of the resilient wire 150. The channel 148 contains ramp formations 149.

The first and second gripping members 110, 140 are molded from a plastic which permits plastic deformation of their gripping surfaces 124, 142, including the v-groove 144 under pressure to conform to fibers received in the v-groove 144.

To assemble the mechanical splice 100, refractive index matching material, such as a fumed silica refractive index matching gel is applied to the v-groove 144 of the second gripping member 140, and the second gripping member 140 is slidably inserted into the opening 122 of the first gripping member 110 to bring the gripping surface 142 of the second gripping member 140 into contact with the gripping surface 124 of the first gripping member 110. In this position of the second gripping member 140, each projection 146 of the second gripping member 140 extends into a respective aperture 132 of the first gripping member 110. The resilient wire 150, which is straight before its insertion into the first gripping member 110, is inserted into the passage 120 at one of the ends 116 of the first gripping member 110 and pushed along that passage 120 until it emerges through one of the holes 134 into the channel 148 of the second gripping member 140 in the opening 122. As a leading end of the resilient wire 150 is pushed along the channel 148, it rides up over a ramp formation 149. The leading end of the resilient wire 150 is urged downward over the other of the ramp formations 149 (by finger pressure, for example) and into the other of the holes 134. In this position, the resilient wire 150 is resiliently deformed over the ramp formations 149, and acts between the first gripping member 110 and the second gripping member 140 to resiliently bias the gripping surface 142 of the second gripping member 140 toward the gripping surface 124 of the first gripping member 110.

Figure 4:
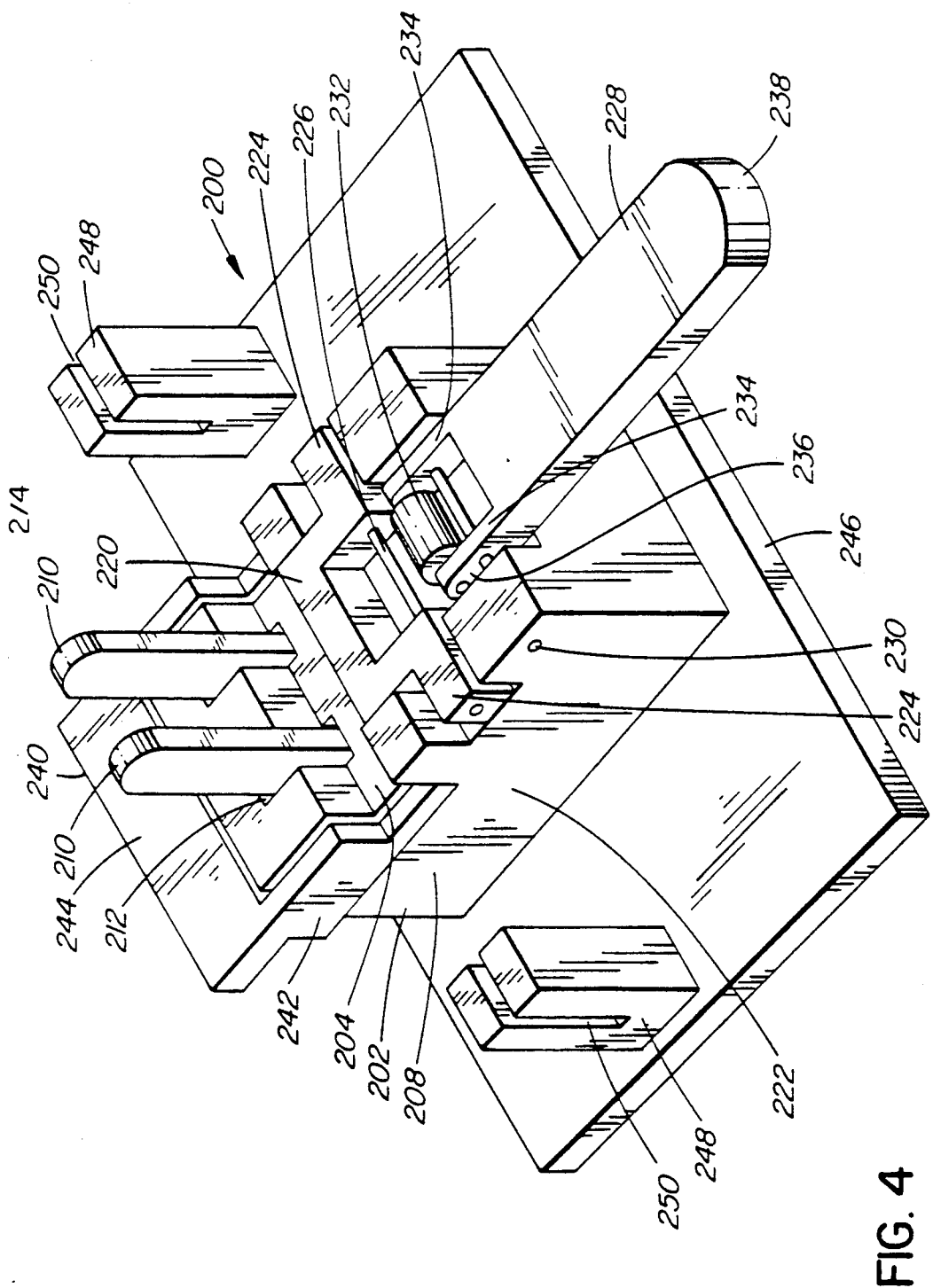
FIG. 4 is a perspective view of a jig for use with the mechanical splice of FIG. 1.
Figure 5A:
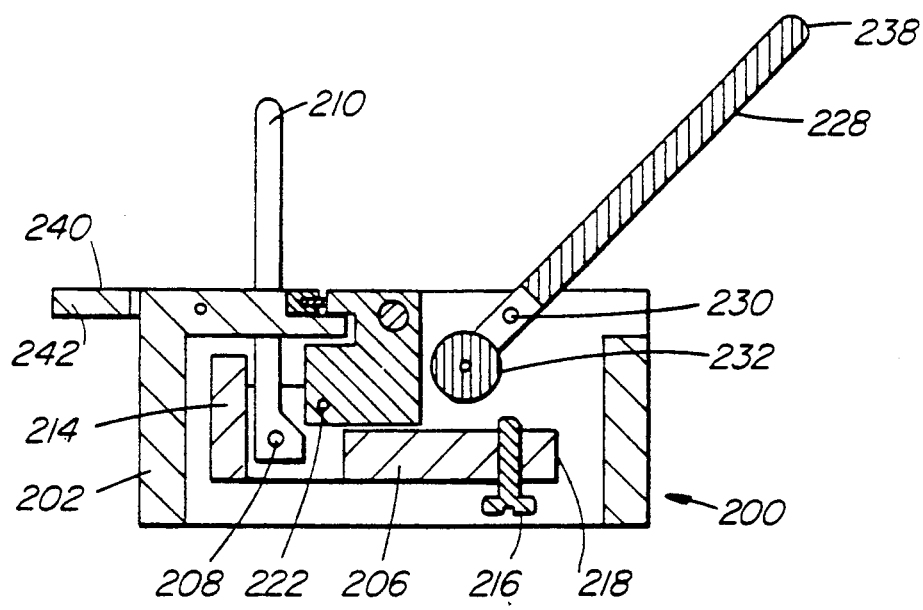
FIGS. 5a–5c are cross-sectional views of the jig of FIG. 4 and the mechanical splice of FIG. 1 during successive steps in the performance of a splicing method according to an embodiment of the invention.
Figure 5B:
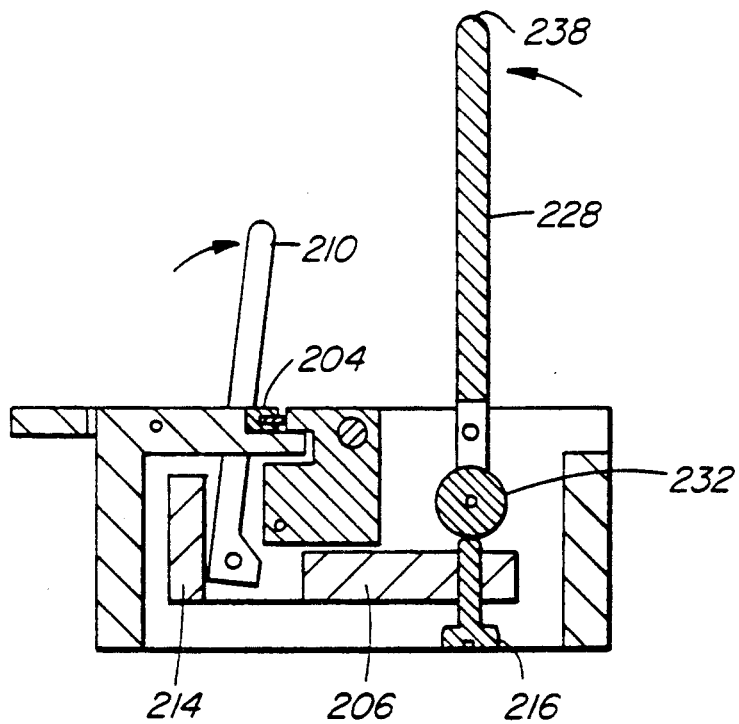
Figure 5C:
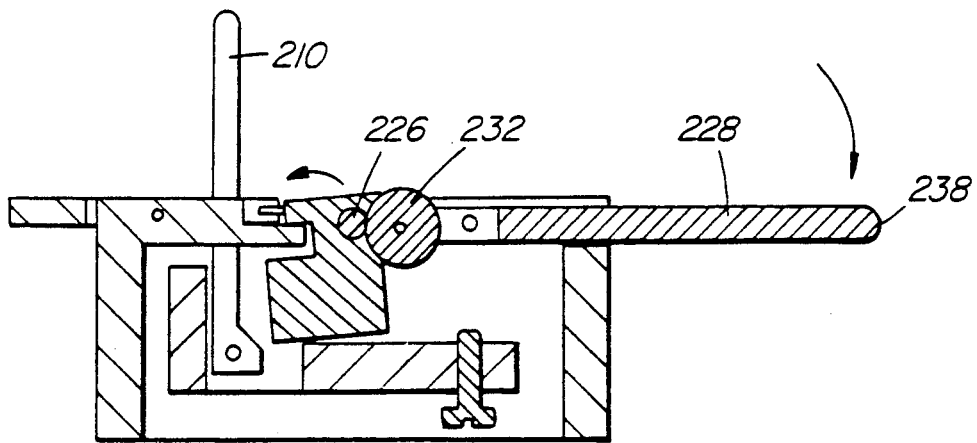

FIG. 4 is a perspective view of a jig 200 for use with the mechanical splice 100. FIGS. 5a–5c are cross-sectional views of the jig 200 at successive stages of its operation.

The jig 200 comprises a block 202 having a groove 204 for receiving and retaining the mechanical splice 100. An L-shaped member 206 is pivotably mounted on a shaft 208 within the block 202 below the groove 204, and a pair of fingers 210 are pivotably mounted to the L-shaped member 206 on the same shaft 208. The fingers 210 project upward through slots 212 in the block 202 and are individually pivotable on the shaft 208 into and out of positions in which they project laterally into the groove 204. Flanges 214 on the L-shaped member 206 engage the fingers 210 to limit the travel of the fingers 210 out of the groove 204. An adjustment screw 216 is threaded through a rear end 218 of the L-shaped member 206.

A compression member 220 is pivotably mounted on a shaft 222 within the block 202 opposite the fingers 210. The compression member 220 defines a central portion of one side wall of the groove 204 and is pivotable on the shaft 222 toward and away from the fingers 210. The compression member 220 has two rearwardly extending arms 224 which are spanned by a spring shaft 226.

A lever arm 228 is pivotably mounted to the block 202 on a shaft 230. The lever arm 228 carries a rotatable roller 232 between bifurcations 234 at a forward end 236 of the lever arm 228.

When a rear end 238 of the lever arm 228 is pivoted upward as shown in FIG. 5b, the roller 232 engages the adjustment screw 216 to pivot the L-shaped member 206. When this is done, the flanges 214 engage the fingers 210 to pivot both fingers 210 into the groove 204. The projection of the fingers 210 into the groove 204 in this position of the lever arm 228 can be adjusted with the adjustment screw 216.

When the rear end 238 of the lever arm 228 is pivoted downward as shown in FIG. 5c, the roller 232 engages the spring shaft 226 of the compression member 220 to pivot the compression member 220 forward toward the fingers 210.

The jig 200 further comprises a c-shaped member 240 which is pivotably mounted to the block 202 on a shaft 242. The c-shaped member 240 has end portions 242 which can be pivoted upward into the groove 204 from a position below the groove 204 by depressing a central portion 244 of the c-shaped member 240.

The jig 200 also comprises a plate 246 on which the block 202 is mounted. A pair of foam blocks 248 are mounted on the plate 246 in alignment with the groove 204 of the block 202. The foam blocks 248 have vertical slits 250 for receiving and slidably holding optical fibers.

To use the jig 200, the lever arm 228 is placed in an intermediate position as shown in FIG. 5a, and the assembled mechanical splice 100 is inserted in the groove 204 with the second gripping member 140 of the mechanical splice 100 against the compression member 220 of the jig 200. The lever arm 228 is raised to the position shown in FIG. 5b to urge both fingers 210 rearward into the groove 204. The fingers 210 engage the projections 146 of the second gripping member 140 to urge the second gripping member 140 away from the gripping surface 124 of the first gripping member 110.

Ends of the optical fibers to be spliced are prepared by removing a predetermined length of protective material. The predetermined length of the protective material which is removed is slightly longer than half of the distance between the shoulders 130 which define the transition between the wide portions 126 and narrow portions 128 of the fiber receiving passage 118. One fiber end is inserted into one end of the passage 118 and pushed along the passage 118 until protective material surrounding the fiber engages a shoulder 130 of the plug element 114. The fiber end is urged slightly past a position in which it first engages the shoulder 130, so that a slight excess of fiber is located between the foam block 248 and the shoulder 130, and the fiber end is urged laterally into the slit 250 of one of the foam blocks 248. The excess fiber is under slight compression and ensures that the protective material surrounding the fiber firmly engages the shoulder 130. In this position of the fiber end, bare fiber extends into the v-groove 144 of the gripping surface 142 of the second gripping member 140. The other fiber end is inserted into an opposite end of the passage 118 and pushed along the passage 118 until it butts against the previously inserted fiber end so that the fiber ends are aligned in the v-groove 144. Butting of the fiber ends may be detected as a slight longitudinal movement of the previously inserted fiber end. With a slight excess of fiber between the other foam block 248 and the shoulder 130, this fiber is urged laterally into the slit 250 of the other foam block 248.

The lever arm 228 is then pivoted to the position shown in FIG. 5a to release the second gripping member 140. Release of the second gripping member 140 allows the resilient wire 150 to urge the second gripping member 140 toward the gripping surface 124 of the first gripping member 110 so as to trap the fiber ends in the v-groove 144 between the gripping surfaces 124, 142 of the first and second gripping members 110, 140.

If the position of only one of the fiber ends requires adjustment, a selected one of the fingers 210 can be urged rearward to individually and selectively urge only one end of the second gripping member 140 away from the gripping surface 124 of the first gripping member 110. When the selected finger 210 is released, the resilient wire 150 returns that end of the second gripping member 140 to the gripping surface 124 of the first gripping member 110.

In one embodiment of the mechanical splice 100, the resilient wire 150 urges the gripping surfaces 124, 142 toward one another with a force which is not sufficient to plastically deform the gripping surfaces 124, 142 around the fiber ends. The jig 200 is designed so that the lever arm 228 can be pivoted past the position shown in FIG. 5a to the position shown in FIG. 5c. In this position of the lever arm 228, the roller 232 urges the compression member 220 forward against the second gripping member 140 to apply force additional to the force provided by the resilient wire 150. The additional force compresses the optical fiber ends between the second gripping member 140 and the first gripping member 110 to plastically deform the gripping surfaces 124, 142, including the walls 143 of the v-groove 144 to conform to the fiber ends. The deformation centres the fiber ends in the v-groove 144 and improves the alignment of fiber ends having slightly different diameters. The deformation also increases the contact area between the fiber ends and the walls 143 of the v-groove 144 so that lateral retaining forces are spread over a larger contact area. During this operation, the shaft 226 of the compression member 220 acts as a spring.

The lever arm 228 is then pivoted upward to the position shown in FIG. 5a to remove the additional compressing force. The end portions 242 of the c-shaped member 240 are then pivoted upward into the groove to eject the completed splice from the jig 200.

Figure 6:
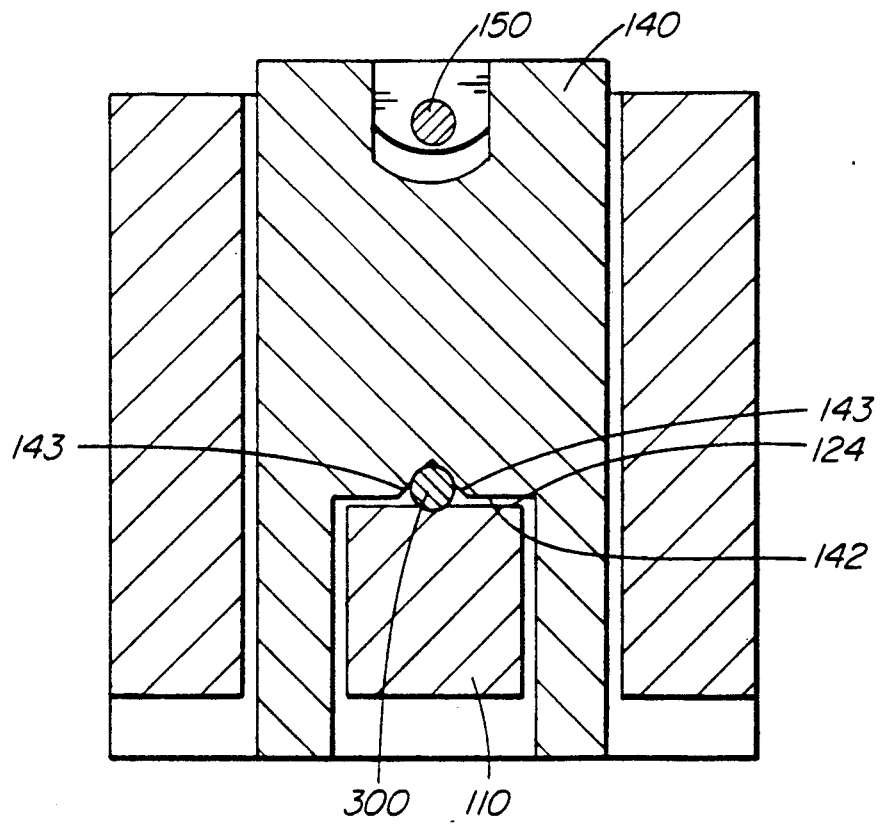
FIG. 6 is an expanded cross-sectional view of a completed splice using the mechanical splice of FIG. 1.

A cross-section of the completed splice is shown in FIG. 6 which illustrates the deformation of the gripping surfaces 124, 142, including the walls 143 of the v-groove 144, to conform to the optical fiber ends 300.

In the mechanical splice 100, a v-groove 144 is provided on the gripping surface 142 of the second gripping member 140. Alternatively, a groove could be provided in the gripping surface 124 of the first gripping member 110. The v-groove 144 has walls 143 which define a 60 degree apex angle 145, but other apex angles could be used.

Not all of the features of the jig 200 are required for successful operation of the mechanical splice 100. For example, the c-shaped ejection member 240 is not required, and the separately pivotable fingers 210 can be replaced by a pair of projections on the L-shaped member 206 if separate adjustment of the bare fiber ends is not required. The block 202 and its supporting plate 246 can be integrally molded. Such simplifications have been adopted in a cost-reduced version of the jig 200.

Moreover, in another embodiment of the mechanical splice 100, the force supplied by the resilient wire 150 is made sufficient to deform the gripping surfaces 124, 142 around the optical fiber ends 300 without additional force supplied by the jig 200. In this case, the jig 200 can be simplified so that it comprises only means for retaining the mechanical splice 100 and means for releasably urging the gripping surfaces 124, 142 apart against the urging of the resilient biasing means 150 to permit insertion of optical fiber ends 300 along the v-groove 144.

These and other variations are within the scope of the invention as claimed below.

We claim:

1. An optical fiber mechanical splice comprising:
   a pair of gripping members, each gripping member having a plastically deformable gripping surface, one of the gripping surfaces having walls defining a v-groove for receiving and aligning optical fiber ends;
   a first of the gripping members having a longitudinally extending passage for receiving optical fibers and an opening which extends laterally into the passage and terminates at the gripping surface of the first gripping member;
   a second of the gripping members being slidably received in the opening of the first gripping member with its gripping surface opposite the gripping surface of the first gripping member; and
   a resilient member carried on the first gripping member, spanning the opening and acting between the first gripping member and the second gripping member to resiliently bias the gripping surfaces toward one another.

2. A mechanical splice as defined in claim 1 wherein the resilient biasing means urge the gripping surfaces toward one another with a force which is insufficient to plastically deform the gripping surfaces around optical fiber ends when said optical fiber ends are placed between said gripping surfaces.

3. A mechanical splice as defined in claim 1 wherein the resilient member urges the gripping surfaces toward one another with a force which is sufficient to plastically deform the gripping surfaces around optical fiber ends when said optical fiber ends are placed between said gripping surfaces.

4. A mechanical splice as defined in claim 1, wherein the first gripping member has at least one aperture extending through its gripping surface.

5. A mechanical splice as defined in claim 4, wherein the second gripping member has at least one projection adjacent to its gripping surface, the projection extending into the aperture of the first gripping member.

6. A mechanical splice as defined in claim 5, wherein the first gripping member has two longitudinally spaced pairs of laterally spaced apertures extending through its gripping surface; and
the second gripping member has two longitudinally spaced pairs of laterally spaced projections, each projection extending into a respective aperture of the first gripping member.

7. A mechanical splice as defined in claim 1, wherein:
the first gripping member has holes on opposite sides of the opening for receiving end portions of the resilient member; and
the second gripping member has a channel for receiving a central portion of the resilient member.

8. A mechanical splice as defined in claim 7, wherein the channel has ramp formations for resiliently deforming the resilient member.

9. A mechanical splice as defined in claim 7, wherein the first gripping member comprises a molded plastic part having the longitudinally extending passage and plug elements received in the passage, the plug elements dividing the passage into a first passage for receiving optical fibers and a second passage for receiving the resilient member.

10. A mechanical splice as defined in claim 1, wherein the passage has wide portions adjacent ends of the first gripping member for receiving optical fibers and surrounding protective material, and narrower portions adjacent the opening for receiving bare optical fiber ends.

11. A mechanical splice as defined in claim 1 having refractive index matching material in the v-groove, the refractive index matching material comprising fumed silica.

12. A mechanical splice as defined in claim 1 wherein the walls of the v-groove define a 60 degree apex angle.

13. A method for mechanically splicing optical fibers, comprising:
   providing a mechanical splice comprising a pair of gripping members and resilient biasing means, each gripping member having a plastically deformable gripping surface, the resilient biasing means acting between the gripping members to resiliently bias the gripping surfaces of the gripping members toward one another, one of the gripping surfaces having walls defining a v-groove for receiving and aligning optical fiber ends;
   moving the gripping surfaces of the gripping members apart against the urging of the resilient biasing means;
   inserting optical fiber ends into the v-groove between the gripping surfaces of the gripping members; and
   urging the gripping surfaces toward one another with the optical fiber ends in the v-groove to engage the fiber ends between the gripping surfaces and to plastically deform the gripping surfaces around the optical fiber ends.

14. A method as defined in claim 13, wherein the resilient biasing means urge the gripping surfaces together with a force which is insufficient to plastically deform the gripping surfaces, the method comprising:
   applying force additional to the force provided by the resilient biasing means to urge the gripping surfaces toward one another with the optical fiber ends in the v-groove to plastically deform the gripping surfaces around the optical fiber ends; and
   removing the additional force, so that only the force provided by the resilient biasing means urges the gripping surfaces toward one another to grip the optical fiber ends between the deformed gripping surfaces.

15. A jig for use with a mechanical splice comprising a pair of gripping members and resilient biasing means, each gripping member having a plastically deformable gripping surface, the resilient biasing means acting between the gripping members to resiliently bias the gripping surfaces of the gripping members toward one another, one of the gripping surfaces having walls defining a v-groove for receiving and aligning optical fiber ends, the jig comprising:

- means for retaining the mechanical splice; and
- means for releasably urging the gripping surfaces apart against the urging of the resilient biasing means to permit insertion of optical fiber ends along the v-groove.

16. A jig as defined in claim 15, wherein the means for releasably urging the gripping surfaces apart comprises means for individually, selectively and releasably urging opposite ends of the gripping surfaces apart.

17. A jig as defined in claim 15, further comprising means for slidably holding optical fiber ends in alignment with a mechanical splice retained by the means for retaining the mechanical splice.

18. A jig as defined in claim 15, further comprising means for releasably urging the gripping surfaces toward one another with a force sufficient to plastically deform the gripping surfaces around the optical fiber ends.

* * * * *